United States Patent
Ikeda et al.

(10) Patent No.: US 6,864,425 B2
(45) Date of Patent: Mar. 8, 2005

(54) CABLE OR THE LIKE PROTECTION AND GUIDE DEVICE

(75) Inventors: Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/780,980

(22) Filed: Feb. 18, 2004

(65) Prior Publication Data

US 2004/0188128 A1 Sep. 30, 2004

(30) Foreign Application Priority Data

Mar. 25, 2003 (JP) ........................................ 2003-083525

(51) Int. Cl.$^7$ ............................................. F16G 13/00
(52) U.S. Cl. .................. 174/74 A; 174/69; 59/78.1; 138/120
(58) Field of Search ............................ 174/72 A, 74 A, 174/69; 59/78.1; 248/49, 51; 138/120

(56) References Cited

U.S. PATENT DOCUMENTS

| | | | | |
|---|---|---|---|---|
| 3,772,875 A | * | 11/1973 | Viano | 59/78.1 |
| 4,384,594 A | * | 5/1983 | Moritz | 138/120 |
| RE35,579 E | * | 8/1997 | Moritz et al. | 59/78.1 |
| 5,724,803 A | * | 3/1998 | Pea | 59/78.1 |
| 6,016,844 A | * | 1/2000 | Takahashi et al. | 138/120 |
| 6,349,534 B1 | | 2/2002 | Zanolloa | |

FOREIGN PATENT DOCUMENTS

| | | |
|---|---|---|
| EP | 0919743 A1 | 6/1999 |
| EP | 1319865 | 6/2003 |
| GB | 2365506 | 2/2002 |
| JP | P3157491 | 2/2001 |
| JP | 04005048.6-1231 | 7/2004 |

* cited by examiner

*Primary Examiner*—Chau N. Nguyen
(74) *Attorney, Agent, or Firm*—Woodling, Krost and Rust

(57) ABSTRACT

An improved cable or the like protection and guide device in which static electricity can be surely escaped and the device can be produced at a reduced cost is disclosed. A cable or the like protection and guide device of the present invention includes a plurality of link bodies (11) articulably connected to each other in the longitudinal direction in a state where a cable or the like (10) was inserted into the device. The link body includes a pair of side plates (21) disposed on both sides of the cable or the like and composed of a conductive synthetic resin. And a linear position and bend position are limited by bend angle limiting means provided on a portion in a side plate, which contacts a side plate of the adjacent link body and a corresponding portion of the side plate of the adjacent link body. The bend angle limiting means comprises a protrusion (31, 35) provided in each side plate and a recess (32, 33) provided on another link body, and is formed of a metallic plate (41) in which one of the protrusion and the recess is laminated on the side plate and which contacts a side plate of the adjacent link body.

2 Claims, 4 Drawing Sheets

US 6,864,425 B2

CABLE OR THE LIKE PROTECTION AND GUIDE DEVICE

This patent application includes a claim of foreign priority to prior filed Japanese Patent Application 2003-083525 filed Mar. 25, 2003.

TECHNICAL FIELD TO WHICH THE INVENTION PERTAINS

The present invention relates to a cable or the like protection and guide device, and more specifically relates to a device suitable for accommodates a cable or the like such as a cable or a hose, which supplies a movable member of an industrial machine with electric power or energy of compression air and guiding and supporting the cable or the like stably and reliably during the movement of the movable portion.

RELATED ART

This kind of cable or the like protection and guide device has a structure that it has link bodies each comprising a pair of left and right side plates whose upper and lower edges were bridged therebetween, side plates of adjacent link bodies are overlapped in the width direction of the link body and pivotably connected therebetween, a flexible accommodation space is formed in connected link bodies, a linear position maintaining stopper of one of the pair of link bodies in adjacent pairs of link bodies is formed, a linear position maintaining stopper surface, which allows the linear position maintaining stopper to abut on the other pair of link bodies in the adjacent pairs of link bodies, is formed, a bend or articulation position limiting stopper for limiting the bend or articulation of adjacent link bodies is formed in the adjacent link bodies, and a bend or articulation position limiting stopper surface, which abut on the bend or articulation position limiting stopper, is formed in the side plates of the other link bodies in the adjacent link bodies.

The cable or the like is inserted into a flexile accommodation space formed by connected link bodies. When a link body is pivoted in a certain direction, a bend or articulation position limiting stopper surface contacts a bend or articulation position limiting stopper to limit a bend or articulation angle to a certain angle. Then when the link body is pivoted in the reverse direction to be in a linear position, a linear position limiting stopper contacts a linear position limiting stopper surface so that further pivoting is blocked. See, for example, Patent reference 1, U.S. Pat. No. 3,157,491.

PROBLEMS TO BE SOLVED BY THE INVENTION

In such a cable or the like protection and guide device, when a number of link bodies are connected to each other, the conductivity of the device is remarkably reduced. Thus, static electricity is allowed to surely escape to the link bodies adjacent to each other by adding carbon powders or carbon fibers to a synthetic resin, which forms the link bodies. However, in the sliding of the adjacent link bodies wear powders are liable to occur and the its cost is increased.

The object of the present invention is to provide an improved cable or the like protection and guide device, which can surely escape the static electricity and can be produced at a reduced cost.

MEANS FOR SOLVING THE PROBLEMS

To attain the above-mentioned object, in a cable or the like protection and guide device according to the present invention, a plurality of link bodies articulably connected to each other in the longitudinal direction in a state where said cable or the like was inserted into said device, each includes a pair of side plates disposed on both sides with respect to the cable or the like and consisting of a conductive synthetic resin, and in which a linear position and a bend or articulation position are limited by a bend angle limiting means provided on a portion in a side plate, which contacts a side plate of the adjacent link body and a corresponding portion of the side plate of the adjacent link body. However, the bend angle limiting means is characterized by being formed of a metallic member provided on the side plate.

ACTIONS

In a cable or the like protection and guide device according to the present invention, although a plurality of link bodies articulably connected to each other in the longitudinal direction in a state where said cable or the like was inserted into said device, each includes a pair of side plates disposed on both sides with respect to the cable or the like and consisting of a conductive synthetic resin, and in which a linear position and a bend or articulation position are limited by a bend angle limiting means provided on a portion in a side plate, which contacts a side plate of the adjacent link body and a corresponding portion of the side plate of the adjacent link body, the bend angle limiting means is formed of a metallic member provided on the side plate. Accordingly, in the movement of the link body, charged static electricity is escaped to the side plates of adjacent link plates through bend angle limiting means composed of a metallic member. Thus even if a plurality of link bodies are connected, the static electricity can be surely escaped. Therefore even if a plurality of link bodies are connected, the static electricity can be surely escaped without increasing an additive, and the device can be produced at low costs. Further, since a side plate contacts side plates of the adjacent link bodies through metallic members, wear of the side plate is small and the mechanical strength of the bend angle limiting means is strong. Accordingly, the wear of the bend angle limiting means is not generated. And since the rigidity of the whole link body is high and the side plates of the link body is hard to flex, the link body is not distorted by the action of external force. Further, since the settling of bend angle limiting means is not generated, a cable or the like protection and guide device having a long service life and excellent reliability can be obtained.

In the present invention, the bend angle limiting means is formed of a metallic plate laminated on the side plate and the metallic plate may contact the side plates of the adjacent link bodies. Accordingly, since each link body contacts the adjacent link body with a wide surface area, static electricity during the bend or articulation movement of the link body can be surely escaped to the adjacent link bodies. Further, the generation of wear powders is reduced so that the rigidity of the link bodies can be further improved.

The invention will be better understood when reference is made to the BRIEF DESCRIPTION OF THE DRAWINGS, DETAILED DESCRIPTION OF THE INVENTION and CLAIMS which follow hereinbelow.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

In an embodiment of the present invention, a bend angle limiting means comprises a protrusion provided on a front portion of each side plate and a recess provided on a rear portion of another link body, and is formed of a metallic plate in which one of the protrusion and the recess is laminated on a side plate and contacts the side plates of the adjacent link bodies.

An example of a cable or the like protection and guide device according to the present invention will be described with reference to drawings below.

Figure 1:
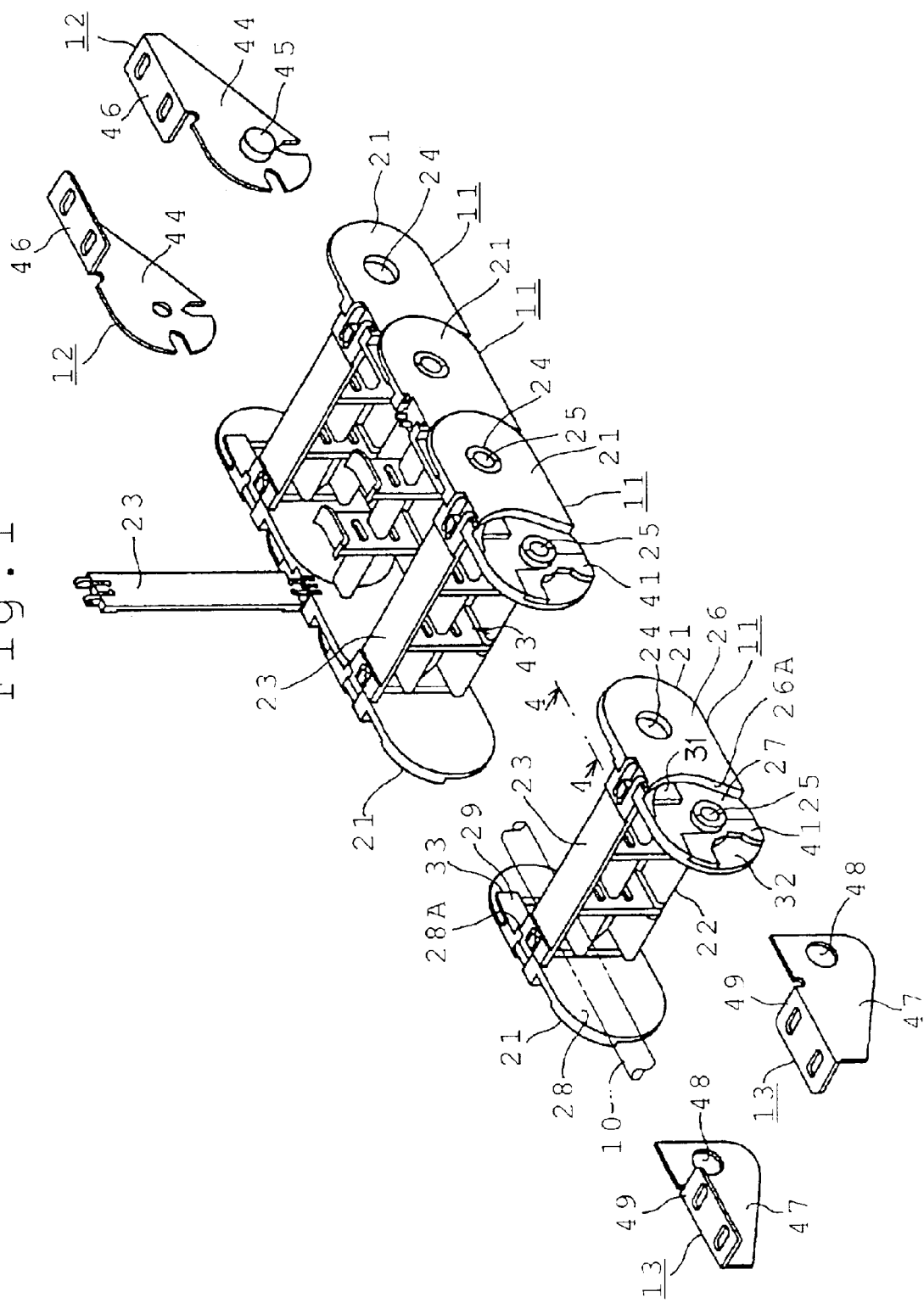
FIG. 1 is an exploded perspective view showing one example of a cable or the like protection and guide device according to the present invention.

This cable or the like protection and guide device includes link bodies 11, movable end fitting 12 and fixed end fitting 13, as shown in FIG. 1.

The link bodies 11 are arranged in a row and are pin-connected to the adjacent link bodies 11. The movable end fitting 12 is connected to a front end of the connected link body row and the fixed end fitting 13 is connected to a rear end thereof. The cable or the like 10 is positioned between the side plates 21 of each link body 11 and is inserted within the link body row.

Each link body 11 includes a side plate 21 and connecting rods 22 and 23. Side plates 21 are arranged with a space in parallel with each other. One connecting rod 22 (hereinafter referred to as an inside connecting rod to be differentiated from the other connecting rod 23) is arranged between side plates 21 so as to bridge bending or articulation inner peripheral sides of the side plates 21. The inside connecting rod 22 is composed of a synthetic resin integrally molded product with the side plate 21. The other connecting rod 23 (hereinafter referred to as an outside connecting rod) is also composed of a synthetic resin injection-molded product, and is arranged between side plates 21 so as to bridge bending or articulation outer peripheral sides of the side plates 21. This outside connecting rod 23 is removably attached to the side plate 21.

The side plate 21 has a shape of a cocoon when viewed from the side. The width between the outer sides of rear side plates is slightly larger than the width between the inner sides of front side plates.

A pin 25 is integrally formed in a rear portion of the side plate 21, and a pin hole 24 having a diameter corresponding to the pin 25 is provided on a front portion of the side plate 21.

Figure 4:
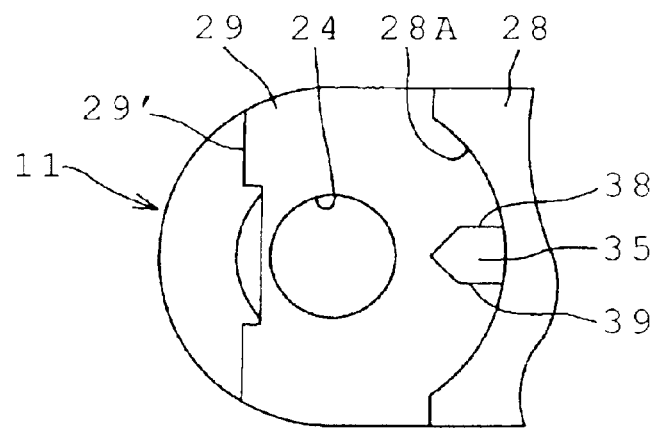
FIG. 4 is an inner side view of a side plate along the line 4—4 in FIG. 1.
Figure 5:
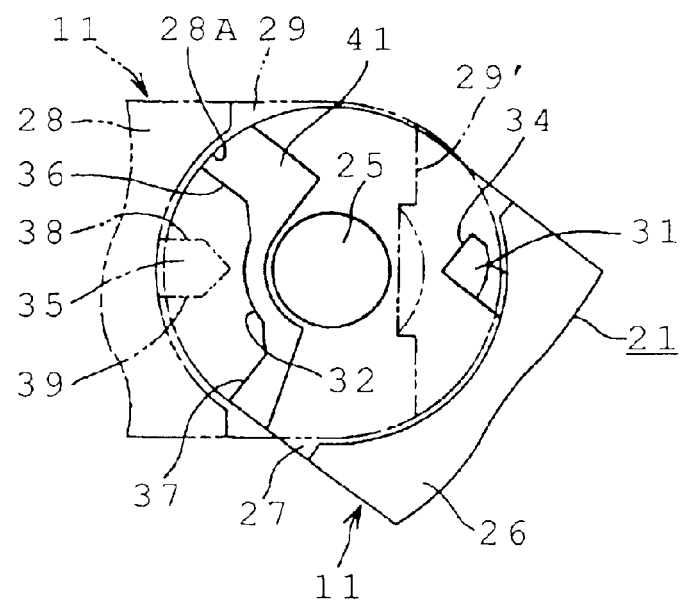
FIG. 5 is an explanatory view showing a bend or articulation state of the cable or the like protection and guide device shown in FIG. 1.

A stepped wall 26 is provided on the outer side of the side plate 21, and a stepped wall 27 is also provided on the rear end side of the stepped wall 26. The rear edge 21 of the stepped wall 26 forms a partial cylindrical surface 26A, whose center axis is coaxially with the pin 25. Further, the inner side of the side plate 21 is provided with a stepped wall as shown in FIG. 4. The front side of the stepped wall 28 forms a stepped wall 29. The stepped wall 29 side front edge in the stepped wall 28 forms a partial cylindrical surface 28A, whose center axis is coaxially with the pin hole 24.

The respective link bodies 11 are connected to each other by fitting the stepped walls 27 of each link body 11 on the stepped walls 29 of the adjacent rear link body 11, fitting the pins 25 into the pin holes 24 of the adjacent rear link body 11, fitting the stepped walls 29 of each link body 11 on the stepped walls 27 of the adjacent front link body 1, and fitting the pin holes 24 into the pin 25 of the adjacent front link body 11. Accordingly, the respective link bodies 11 are capable of pivoting or articulating about the pins 25 between the adjacent link bodies 11.

The bend angle or pivot angle of the link body 11 is limited by bend angle limiting means provided between the rear portion of the side plate 21 and the front portion of the adjacent link body 11 and the bend angle limiting means provided between the front portion of the side plate 21 and the rear portion of the adjacent link body 11 as in the cable or the like protection and guide device described in the specification of Japanese patent No. 3157491.

Figure 2:
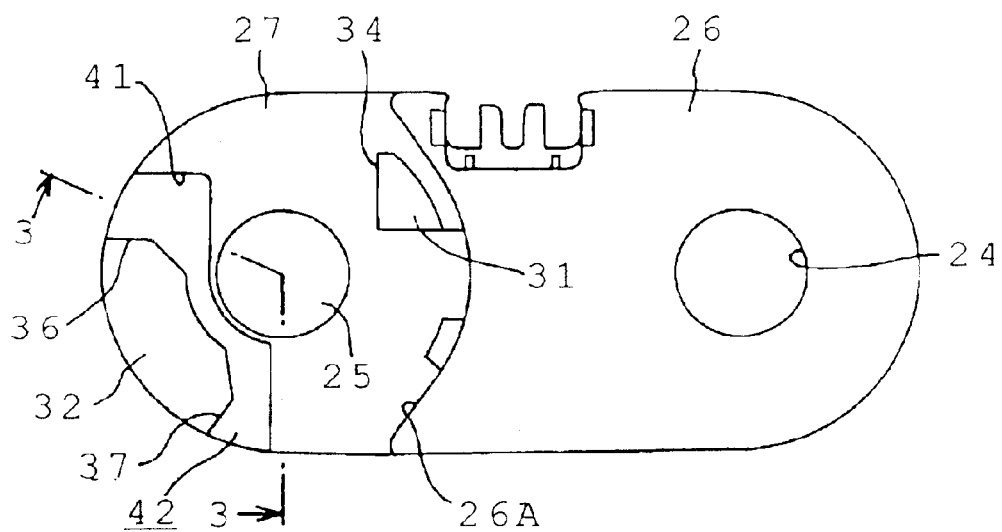
FIG. 2 is a side view of a link body, which forms the cable or the like protection and guide device shown in FIG. 1.
Figure 3:
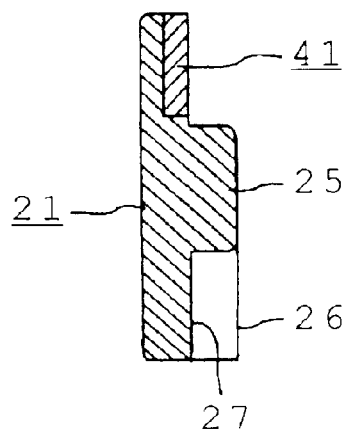
FIG. 3 is a cross-sectional view taken along the line 3—3 in FIG. 2.

Among the bend limiting means, the bend limiting means in the rear portion of the link body comprises a semicircular protrusion 31 and a recess 32 as shown in FIG. 2. The semicircular protrusion 31 has a fan shape, and is formed integrally with the side plate 21 in such a manner that the partial cylindrical surface faces the cylindrical surface 26A of the stepped wall 26, the rear end surface 34 of the protrusion 31 faces the rear end of the link body and the protrusion 31 is protruded from the stepped wall 27. The recess 32 has an arc shape whose central axis is coaxial with the pin 25, and is formed of a metallic plate laminated on the stepped wall 27 as described later.

The bend angle limiting means positioned at the front portion of the link body 11 comprises a cutout circle-shaped recess 33 and an arrow-shaped protrusion 35 as shown in FIG. 4. The cutout circle-shaped recess 33 is formed by cutting out a front end of the stepped wall 29, and the front side 29' of the stepped wall 29 is a vertical surface. The arrow-shaped protrusion 35 is provided on the stepped wall 29. The arrow-shaped protrusion 35 is formed integrally with the side plate 21 in such a manner that the tip faces the front end of the link body 11, the rear end is connected to the stepped wall 28 and the protrusion 35 is protruded from the stepped wall 29.

In the whole link bodies 11 which are in parallel while a link body is connected with the adjacent link bodies, when a stepped wall 27 is fitted to a stepped wall 29 of the rear adjacent link body 11, the rear end surface 34 of the semicircular protrusion 31 is brought into contact with an end surface 38 of the arrow-shaped protrusion 35 in the adjacent link body 11, and an end surface 36 forming the recess 32 is brought into contact with the tip surface 38 of an arrow-shaped protrusion of the rear adjacent link body 11. Further, when a stepped wall 29 is fitted to a stepped wall 27 of the front-adjacent link body 11, the front end surface 29' of the stepped wall 29 forming the cutout circle-shaped recess 33 is brought into contact with the rear end surface 34 of the semicircular protrusion 31 in the front adjacent link body 11 and the tip surface 38 of the arrow-shaped protrusion 35 is brought into contact with an end surface 36.

When the link body 11 is bent about the pin 25 in a clockwise direction with respect to the rear adjacent link body 11, the rear end surface 34 of the semicircular protrusion 31 is separated from the front end surface 29' of the stepped wall, which forms the cutout circle-shaped recess 33 in the rear adjacent link body 11, and the recess 32 is moved while slide-contacting the arrow-shaped protrusion 35 in the rear adjacent link body 11. Then when an end surface 37 of the recess 32 contacts the tip surface 39 of the arrow-shaped protrusion 35 in the rear adjacent link body 11, bending or articulation of the link body 11 is limited. Further, when the link body 11 is bent to the largest angle about the pin 25 in a counterclockwise direction with respect to the front adjacent link body 11, the front end surface 29' of the stepped wall, which forms the cutout circle-shaped recess 33, is separated from the rear end surface 34 of the semicircular protrusion 31 in the front adjacent link body 11. Then when a tip surface 39 of the arrow-shaped protrusion 35 contacts the end surface 37 of the recess 37 in the front adjacent link body 11, bending or articulation of the link body 11 is limited.

However, in the cable or the like protection and guide device according to the present invention the recess 32, positioned at the rear portion of the link body is formed of a metallic member. The recess 32 is formed in for example a metallic plate as a cutout, and this metallic plate is buried in the stepped wall 27 in the side plate 21. This metallic plate 41 will be described in detail.

The metallic plate 41 is surrounded by outer and inner arc portions, which have coaxially provided together with the pin 25, an inverse L-shaped portion, which connects ends of these arc portions and a vertical portion, which connects the other ends of these arc portions. The recess 32 of the bend angle limiting means is provided in the outer arc portion as a cutout. On the other hand, the stepped wall 27 in the side plate 21 is provided with a fitting recess portion 42, which corresponds to the outline of this metallic plate 41. The depth of the fitting recess 42 is for example a half of the thickness of the stepped wall 27. When the side plate 21 and the inside connecting rod 22 are resin-molded, the metallic plate 41 is incorporated into the fitting recess 42 by insert molding. Since the depth of the fitting recess 42 corresponds to the thickness of the metallic plate 41, the outer surface of the metallic plate 41 has the same plane as the stepped wall 27. Accordingly, the recess 32 is composed of metal in the end surfaces 36 and 37 and a synthetic resin in the bottom surface.

A cable or the like is inserted into this cable or the like protection and guide device according to the present invention as in the conventional cable or the like protection and guide device. In each link body 11, partitioning members 43 disposed between the side plates partition the space formed by the side plates 21. A cable or the like 10 is positioned in the tunnels respectively formed by partitioned spaces in a link body row. The incorporation of the cable or the like 10 is performed for example by opening the outside connecting rods 23 of all link bodies 11, inserting the cable or the like 10 into the tunnels and closing the outside connecting rods 23.

This cable or the like protection and guide device is used for protecting and guiding a cable or the like, which connects a horizontal boring machine to an attachment. The cable or the like 10 is a power cable, which connects a motor on the spindle head and a power unit, or a hose, which connects a cutting liquid nozzle on the spindle head and a cutting liquid tank and the like.

A movable end fitting 12 has an L-shape as shown FIG. 1, and is composed of the same material as that of the link body 11. A pin 45 on a mounting piece 44 is fitted into a pin hole 24 on a side plate 21 of the link body 11 on one end of a row of link bodies, and a fixed piece 46 is bolt-fastened to a main shaft head. A fixed end fitting 13 has also an L-shape as shown FIG. 1, and is composed of the same material as that of the link body 11. A pin hole 48 in a mounting piece 47 is fitted on a pin 25 on a side plate 21 of the link body 11 on the other end of a row of link bodies, and a fixed piece 49 is bolt-fastened to a horizontal boring machine or a column.

The grounding is performed by connecting the fixed end fitting 13 to a ground of the power source unit or a ground designed for exclusive use. The side plate 21 and the inside connecting rod 22 are composed of a conductive synthetic resin molded product, as mentioned above, and the recess 32 in the connecting portion of the link body 11 is formed of a metallic plate. Thus, when grounded, since the respective side plates 21 are in contact with the metallic plates 41 on the side plates 21 in the adjacent link bodies 11, the respective link bodies 11 are electrically connected to each other.

When the spindle head is moved, the link body 11 is moved linearly and bent in accordance with the stroke so that the length of the cable or the like 10 is adjusted. When the link body 11 is bent or articulated, static electricity is generated by friction between adjacent link bodies 11. However, since the respective link bodies 11 are not only composed of a synthetic resin but also contact each other through metallic plates 41, charged static electricity is escaped from the fixed end fitting 13 to the ground through adjacent link bodies 11. Therefore, even if a plurality of link bodies 11 are connected to each other, the link bodies 11 may be formed of a low cost conductive resin without an additive such as carbon fiber or carbon particles or the like. Even if the additive is necessary, static electricity can be surely escaped by a small additive.

Further, side plates 21 contact the side plates 21 in the adjacent link bodies 11 through metallic plates 41, that is the outline of them is flat. Thus, friction coefficient between the side plates 21 of the adjacent link bodies 11 is low and wear of the link bodies 11 is small. Additionally since the mechanical strength of the link bodies is strong, wear thereof does not occur. Further, since the rigidity of the whole link bodies is increased by the metallic plates 41 and the side plates 21 become hard to flex, even if external force is exerted, the side plates 21 are not distorted and the settling of bend angle limiting means is not generated. Accordingly, a cable or the like protection and guide device having a long service life and excellent reliability can be obtained.

The metallic plate 41, which forms a recess 32, can be manufactured by punching a metallic sheet for example. The incorporation of the metallic plate 41 into a link body 11 can be performed by insert molding without changing a conventional link body manufacturing process significantly. In this process of the present invention an additive such as carbon fiber or carbon particles or the like is not needed, and even if the addition of the additive is needed it may be performed by a small amount of additive. Thus the production of the metallic plates 41 can be carried out at low costs.

Figure 6:
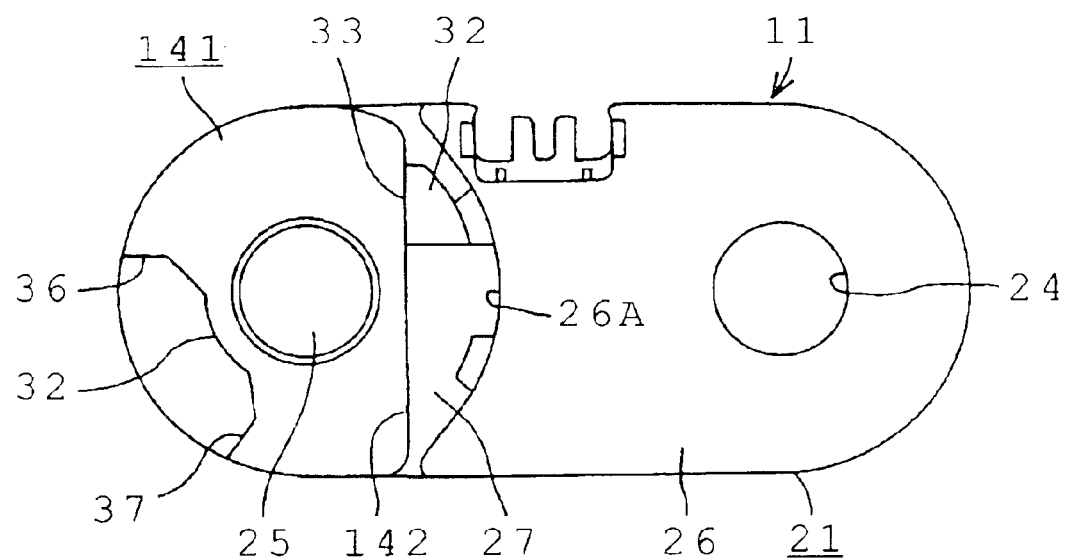
FIG. 6 is a side view of a link body in another example of a cable or the like protection and guide device of the present invention.

In the cable or the like protection and guide device according to the present invention, the metallic plate 41, which forms a bend angle limiting means in a link body 11, may cover a wider area of a side plate 21. FIG. 6 shows a side of a link body 11, which forms such a cable or the like protection and guide device.

This link body 11 is formed in the same manner as in the link body of the cable or the like protection and guide device described with reference to FIGS. 1 to 5. A metallic plate is designated by a reference numeral 141 to differentiate from the above-described metallic plate 41.

This metallic plate 141 has a semicircular shape, formed by an outer arc consisting of a semicircle having the same center as in a pin 25, and a straight line, which connects both ends of the outer arc. There is a through hole 42 having an inner diameter slightly larger than the outer diameter of the pin 25 at the center of the metallic plate 141. Further, a cutout 43 is provided in the outer arc. The shape of the cutout 43 corresponds to the shape of the recess 32 of a bend angle limiting means. The metallic plate 141 is incorporated into a fitting recess portion 142 formed on a stepped wall 27 of the side plate 21. The incorporation of the metallic plate 141 is performed by insert molding of the metallic plate 141 when the inside connecting rod 22 is resin-molded.

In the cable or the like protection and guide device having the thus constructed link bodies 11, since the respective link bodies 11 are not only composed of a synthetic resin but also the side plates 21 of adjacent link bodies 11 contact each other through metallic plates 41 each having a wider surface area, charged static electricity can be escaped from the fixed end fitting 13 to the ground through adjacent link bodies 11. Therefore, even if a plurality of link bodies 11 are connected to each other, an additive such as carbon fiber or carbon particles are not needed at all. Thus, resin molding of the side plate 21 and the inside connecting rod 22 can be easily carried out so that yield of the molding is increased and the molding costs can be reduced.

Further, by increasing the surface area of the metallic plate 141 the wear of the side plate 21 is decreased and at the same time the rigidity of the whole link body is increased. And even if external force is acted the side plate 21 is not distorted at all and the breakage of the link body 11 can be further decreased. Accordingly, a cable or the like protection and guide device having more excellent reliability can be obtained.

In the example described above, by forming only the recess 32 forming a bend angle limiting means of a metallic plate 41 or 141, noise and the like was decreased. However, in a case where the cable or the like protection and guide device according to the present invention is incorporated into a device, which needs high speed and high frequency operation, in accordance with environment for arrangement the life and the endurance of the bend angle limiting means may be improved by forming a protrusion 31 or 35 by a metallic plate or by forming a front end surface 29' of a stepped wall, which forms a cutout circular recess 33 by a metallic plate incorporated into the stepped wall 29 or by forming these all elements by a metallic plate. Further, these elements can be formed by not only a metallic plate but also another member such as castings or the like obtained by another process.

Further, in the example, the link bodies 11 are pin-connected to each other. That is the cable or the like protection and guide device has such a structure that the pin 25 in each link body 11 is fitted into a pin hole 24 of the front adjacent link body 11 and the pin hole 24 is fitted onto a pin 25 of the rear adjacent link body 11. However, the present invention is not limited to such a structure and may adopt another structure.

EFFECTS OF THE INVENTION

As mentioned above, in a cable or the like protection and guide device according to the present invention, although a plurality of link bodies articulably connected to each other in the longitudinal direction in a state where said cable or the like was inserted into said device, each includes a pair of side plates disposed on both sides with respect to the cable or the like and consisting of a conductive synthetic resin, and in which a linear position and a bend or articulation position are limited by bend angle limiting means provided on a portion in a side plate, which contacts a side plate of the adjacent link body and a corresponding portion of the side plate of the adjacent link body, the bend angle limiting means is formed of a metallic member provided on the side plate. Accordingly, in the movement of the link body, charged static electricity is escaped to the side plates of adjacent link plates through bend angle limiting means composed of a metallic member. Thus even if a plurality of link bodies are connected, the static electricity can be surely escaped. Therefore even if a plurality of link bodies are connected, the static electricity can be surely escaped without increasing an additive, and the device can be produced at low costs.

DESCRIPTION OF REFERENCE NUMERALS

10 . . . Cable or the like
11 . . . Link body
12 . . . Movable end fitting
13 . . . Fixed end fitting
21 . . . Sideplate
22, 23 . . . Connecting rod
24 . . . Pin hole
25 . . . Pin
26 to 29 . . . Stepped wall
31 . . . Semicircular protrusion
32 . . . Recess
33 . . . Cutout circle-shaped recess
34 . . . Rear end surface of semicircular protrusion 35
41, 141 . . . Metallic plate
42, 142 . . . Fitting recess portion of metallic plate 41

The invention has been described by way of examples only and those skilled in the art will readily recognize that certain changes and modifications may be made to the examples without departing from the spirit and scope of the appended claims.

What is claimed is:

1. A cable protection and guide device in which a plurality of link bodies are articulably connected to each other in the longitudinal direction in a state where said cable was inserted into said device, each link body includes a pair of side plates disposed on both sides with respect to the cable and consisting of a conductive synthetic resin, the linear position of each said side plate and bend or articulation position of each said side plate are limited by bend angle limiting means provided on a portion of each said side plate, said angle limiting means contact each said side plate of the adjacent link body and a corresponding portion of the side plate of the adjacent link body characterized in that said bend angle limiting means is formed of a metallic plate laminated on each side plate and said metallic plate contacts the side plates of the adjacent link bodies.

2. A cable protection and guide device comprising a plurality of link bodies articulably connected to each other in the longitudinal direction in a state where said cable was inserted into said device, each said link body includes a pair of side plates disposed on both sides with respect to the cable, each said side plate includes a frontal portion and a rear portion, each said side plate of each said link body consists of a conductive synthetic resin, said link bodies bend or articulate with respect to each other, the linear and bend or articulation positions are limited by bend angle limiting means provided on each said side plate, each of said bend angle limiting means of each said side plate contact respective side plates of the adjacent link body, characterized in that said bend angle limiting means comprises:
said front portion of each said side plate including a frontal protrusion and a frontal recess,
said frontal protrusion and said frontal recess are laminated on said frontal portion of each of said side plate and are formed of metal,
a rearward protrusion and a rearward recess provided on said rear portion of each said side plate, and,
each of said frontal protrusions and recesses contact each of said side plates of said adjacent link bodies.

* * * * *

UNITED STATES PATENT AND TRADEMARK OFFICE
CERTIFICATE OF CORRECTION

PATENT NO. : 6,864,425 B2
DATED : March 8, 2005
INVENTOR(S) : Ikeda et al.

It is certified that error appears in the above-identified patent and that said Letters Patent is hereby corrected as shown below:

Column 1,
Line 47, after "1" delete "US".

Column 4,
Line 10, after "body", delete "1" and insert -- 11 --.

Signed and Sealed this

Twenty-fourth Day of May, 2005

JON W. DUDAS
*Director of the United States Patent and Trademark Office*